Patented May 10, 1949

2,469,395

UNITED STATES PATENT OFFICE 2,469,395

PRECIPITATION OF CELLULOSE TRIACETATE

Carl J. Malm and Carlton L. Crane, Rochester, N. Y., assignors to Eastman Kodak Company, Rochester, N. Y., a corporation of New Jersey No Drawing. Application March 30, 1946, Serial No. 658,570

8 Claims. (Cl. 260—230)

This invention relates to the precipitation of cellulose triacetate from its solution in which the dilution and temperature conditions are so adjusted that the final product consists of a finely divided powdered precipitate of the cellulose triacetate.

In the manufacture of the usual types of cellulose acetate which are acetone soluble, the cellulose ester is readily separated from its esterification solution in a form which is susceptible to washing and dissolving in organic solvents. In the case of cellulose triacetate, on the other hand, conventional cellulose acetate precipitation methods result in a gelatinous precipitate which is difficult to wash and dries down to a horny insoluble unstable product. As a consequence, two solutions to this problem have been advanced in the prior art, namely, (1) the use of the esterification solution directly for forming products, and (2) the use of special precipitation and treatment methods for the triacetate.

The first type of procedure in which cellulose triacetates are employed for making products directly from esterification solutions is illustrated by U. S. Patents Nos. 2,236,648 of Nagel and 2,128,340 of Werner. In these procedures the acetylated solution which consists of a solution of cellulose triacetate in acetic acid, acetic anhydride and catalyst is treated with a material to neutralize the catalyst and then with aqueous acetic acid to convert the acetic anhydride to acid. The solution is then subjected to a stabilizing treatment which appears to be necessary before the triacetate can be employed for preparing products therefrom. These methods, however, result in products which present hard, horny surfaces and leave much to be desired as to characteristics.

The other procedure, namely, the use of special treatments in obtaining the cellulose triacetate as a precipitate is illustrated by U. S. Patent No. 2,180,009 of Malm. By that method a soft fibrous precipitate is obtained. However, this precipitate washes slowly and due to the relatively high concentration of acetic acid which is necessary in the precipitation operation to obtain a finely divided precipitate, comparatively poor yields are obtained.

One object of our invention is to provide a useful process for separating cellulose triacetate from its esterification mass. Another object of our invention is to provide a process of precipitating cellulose triacetate in a non-fibrous powder form. A further object of our invention is to prepare a cellulose triacetate material characterized by washing readily. A still further object of our invention is to provide a precipitation method in which cellulose triacetate is separated from its esterification mass in good yields. Other objects of our invention will appear herein.

We have found a method of precipitating cellulose triacetate (42–44.8% acetyl) from its esterification mass in a form which is powdery and non-fibrous, which product washes readily and is obtained in good yields. We have found that if the solution of cellulose triacetate in the esterification mass obtained at the end of the esterification is diluted with 20–40% aqueous acetic acid, and the catalyst, before or during this time, is neutralized with a magnesium compound, such as magnesium acetate, followed by raising the temperature above 170° F. and rapidly precipitating with aqueous acetic acid of 10–20% strength in excess, there results a finely divided powdered, dense precipitate which washes and drains easily and is easy to stabilize. We have found that any appreciable variation from the conditions specified here will result in a milky liquid, rather than a readily separable precipitate.

The neutralization of the catalyst in the esterification mass is preferably with a magnesium compound, such as magnesium acetate, magnesium oxide, magnesium hydroxide, or magnesium carbonate as the use of magnesium for neutralizing results ordinarily in a product of the best stability. Any magnesium salt which forms magnesium sulfate with the sulfuric acid catalyst used may be employed. It is to be understood, however, that the neutralization procedure may be carried out with other alkaline materials, such as calcium compounds or sodium compounds corresponding to those listed above as useful magnesium compounds. It is important that this neutralization procedure be carried out prior to raising the temperature of the mass above 170° F. to avoid derogatory action upon the cellulose ester. This neutralization procedure may be carried out while the dilution is taking place. For instance, if magnesium acetate is employed, it may be dissolved directly in the diluting liquid which is added to the esterification mass.

The esterification mass which is treated in accordance with our invention may be that resulting from any process in which cellulose is esterified with acetic anhydride and an acidic acetylation catalyst. For instance, the esterification mass resulting from the esterification described in U. S. Patent No. 2,180,009 of Malm may be employed as the starting material for the precipitation process of our invention. The cellulose esters which are precipitated in accordance with our invention are ordinarily characterized in the art as cellulose triacetates and have an acetyl content within the range of 42–44.8%. These are the esters that result from acetylating cellulose in which the resulting product is subjected to little or no hydrolysis.

The esterification mass containing the cellulose triacetate in solution not only is subjected to catalyst neutralization, but also is diluted with aqueous acetic acid of 20–40% concentration so that the liquid which is then present essentially consists of acid of 55–65% concentration. This addition of acid may, if desired, be added in portions. If desired, the neutralizing agent may be dissolved in one of these portions and added to the mass in this manner. If the heating is also being applied, it would be desirable to add the neutralizing agent before the temperature is increased to any considerable extent. This mass is then heated to a temperature of more than 170° F. If desired, the heating and the addition of diluting acid may be carried out concurrently. Obviously, under ordinary conditions the temperature will not exceed the boiling point of the mixture under the conditions present. The particle size of the precipitate to be obtained may be varied to some extent by the viscosity of the material at this point. The thinner or less viscous the mass, the finer the precipitate will be. This viscosity reduction is accomplished both by the dilution with the aqueous acetic acid and by the temperature to which the mass is raised. The acid which is employed for diluting the esterification mass may conveniently be the precipitation liquid from a previous batch. It is desirable throughout our process that the esterification mass be subjected to stirring or agitation to assure thorough mixing of the acid added to the mass.

After the mass has been raised in temperature above 170° F., the acid concentration thereof is brought down to 30–40% by adding aqueous acetic acid thereto in excess while continuing the agitation of the mass. By thus bringing down the acid concentration the cellulose triacetate precipitates out in the form of a powder. It is preferred that the aqueous acetic acid employed to bring the mass down to precipitating conditions be of a strength of 10–30%. This acid is added in excess so as to bring the mass well within the 30–40% range of acid concentration.

In the precipitation operation the temperature should be brought down to below 120° F. at the time the precipitation is occurring, or very shortly thereafter. It is preferable that the temperature of the mass should be started to drop rapidly within the range of 0 to 10 minutes of the precipitation time. The temperature should be reduced to below 120° F., and preferably 100° F. or less, within 15 minutes after the acid concentration has been reduced to a point where precipitation occurs, namely, within the range of 30–40% acid. This reduction of temperature may be brought about easily by one of two different ways: (1) by adding cooled precipitation acid (such as 30–70° F.) to the mass or (2) by cooling the mass after the cellulose ester has precipitated. As the dilution in the first step brings the mass very close to the point of precipitation, the addition of cooled precipitation acid accomplishes precipitation and cooling at substantially the same time. This cooling of the mass hardens the precipitate which is formed and improves the ease of separating it from the mass and of washing it after separation. The cooling of the mass may be carried to any temperature less than 120° F., above the freezing point of the aqueous acid. The precipitate obtained by a precipitating process in accordance with our invention when examined under the microscope will have the form of very fine granules as contrasted with the fibrous form in which cellulose acetates are ordinarily obtained. The powder thus obtained after separating from the liquid in which it was precipitated is readily susceptible to any of the conventional water-washing operations and may be washed with water counter-currently, by separate washing, or any of the other washing operations which are employed. The product obtained when dried is friable, and if lumping does occur, the lumps are easily broken apart by hammer milling, for instance. Because of the thermoplastic nature of the cellulose ester while it still contains acid, it is desirable in the initial washing operations that the water used be that which is ordinarily known as cool water. It is to be understood, however, that no special cooling operation is necessary, but, however, water which has been subjected to a heating operation should be avoided.

After dilution of the cellulose esterification mass and before precipitation, it is desirable that the temperature of the diluted mass be raised to at least 170° F. and preferably above 180° F. The maximum to which the mass may be heated is governed by the boiling temperature of the mass. As the liquid present is aqueous acid of 55–65% concentration, the boiling point of water under conditions present would not be greatly exceeded. By having the temperature above at least 180° F. the mass is readily flowable, and the precipitation readily occurs with the obtaining of a fine precipitate. We have found that ordinarily the more flowable the mass which is employed in the precipitation proper, the more finely divided is the precipitate obtained.

The following example illustrates our invention:

One part of cotton linters was presoaked in a Werner and Pfleiderer-type mixer with 4 parts of acetic acid for one hour at 110° F. A mixture of 2.4 parts of acetic acid and .00324 part of sulfuric acid were added to the mixer. The mass was then cooled to 65° F. and 2.8 parts of acetic anhydride were added thereto. The mass was cooled to 50° F., and the mixture of 0.037 part of acetic acid and 0.07 part of sulfuric acid were stirred into the mass. The temperature of the mixer was so regulated that it rose to a temperature of 90° F. over a period of 2¼ hours and was kept at that point until all of the cellulose had been acetylated. 1.2 parts of 66.6% acetic acid were added to the mass over a period of 30 minutes, during which the temperature of the mass rose to 120° F. A further 1.2 parts of 66.6% acetic acid were added over a 30-minute interval, following which 1.88 parts of 78.7% acetic acid were added. The mass was held at 120° F. for one hour, and the sulfuric acid which was present was neutralized by adding a solution of .00706 part of magnesium carbonate in 0.2 part 60% acetic acid to the mass. A portion of the resulting mass which will be designated as one part was placed in a jacketed turbo-type mixer in which the rotor revolved at 220 R. P. M. 0.575 part of 37% acetic acid was gradually mixed in. The temperature of the mass was raised to 160° F. and a further 0.575 part of 37% acetic acid was added at the same time raising the temperature to 170° F. Upon the mixing in of the dilute acetic acid, the temperature of the mass was raised to 180–185° F. and 1.33 parts of 20% acetic acid were rapidly added to the mass producing a finely divided precipitate. Cold water (50° F.) was then passed through the jacket of the mixer for from 3 to 5 minutes so as to cool the slurry and thereby harden the precipitate. The slurry was then transferred to wash tanks equipped with porous stone bottoms wherein it was washed with five 2-hour changes of distilled water and then boiled for 4 hours in distilled water. After boiling, the precipitate was washed until the pH of the water was 5. The batch was then drained and given a 1-hour soak in a solution of .0003 part of magnesium carbonate in sufficient water to cover the precipitate. The cellulose acetate powder was then centrifuged, passed through a micro-pulverizer while wet and dried at 160° F. The powder was dried while in motion to prevent crusting of the material during the initial stages. The dry cellulose triacetate material was found to be friable; any lumps which were present could easily be powdered. The final product was analyzed and was found to have an acetyl content of 43.7% and a viscosity in 10% solution in methylene chloride-methyl alcohol (9:1) of 3950 centipoises.

The above example is to be understood as illustrative of the use of equipment which has been found to be satisfactory for powder precipitation in accordance with our invention. Nevertheless, other types of mixers or agitating units may be employed for carrying out the precipitation instead of that listed, the criterion being that the mass be well agitated and a means of temperature control be provided. In the drying of the precipitate any drying apparatus in which the powder precipitate is moved while drying may be employed. Some of the procedures which may be employed for this drying operation are by providing a series of ploughs against a moving belt, by using a rotary tunnel drier, or by intermittent manual agitation of the material while on a tray drier. The cellulose triacetate powder obtained is characterized by being readily susceptible to washing and being easily and rapidly dissloved in solvents in which the respective cellulose triacetates are soluble.

We claim:

1. A method of preparing a powder precipitate of cellulose triacetate which comprises mixing an esterification mass, which contains an acylation catalyst and in which the cellulose triacetate is disolved, with a neutralizing agent for the catalyst and with 20–40% aqueous acetic acid to dilute the mass to approximately 55–65% aqueous acid, heating the solution to a temperature above 170° F., then rapidly mixing into the solution sufficient 10–30% aqueous acetic acid to bring the acid concentration of the mass down to 30–40% thereby precipitating the cellulose triacetate and forming a slurry, and within fifteen minutes cooling the slurry to a temperature below 120° F. at which the aqueous acid remains liquid and separating the cellulose triacetate particles from the liquid with which they are in contact.

2. A method of preparing a powder precipitate of cellulose triacetate which comprises mixing an esterification mass, which contains sulfuric acid catalyst and in which the cellulose triacetate is dissolved, with a magnesium compound neutralizing agent for the catalyst and with 20–40% aqueous acetic acid to dilute the mass to approximately 55–65% aqueous acid, heating the solution to a temperature above 170° F., then rapidly mixing into the solution sufficient 10–30% aqueous acetic acid to bring the acid concentration of the mass down to 30–40% thereby precipitating the cellulose triacetate and forming a slurry, and within fifteen minutes cooling the slurry to a temperature below 120° F. at which the aqueous acid remains liquid and separating the cellulose triacetate particles from the liquid with which they are in contact.

3. A method of preparing a powder precipitate of cellulose triacetate which comprises mixing an esterification mass, which contains an acylation catalyst and in which the cellulose triacetate is dissolved, with a neutralizing agent for the catalyst and with 20–40% aqueous acetic acid to dilute the mass to approximately 55–65% aqueous acid, heating the solution to a temperature within the range of 180–185° F., then rapidly mixing into the solution sufficient 10–30% aqueous acetic acid to bring the acid concentration of the mass down to 30–40% thereby precipitating the cellulose triacetate and forming a slurry, and within fifteen minutes cooling the slurry to a temperature below 120° F. at which the aqueous acid remains liquid and separating the cellulose triacetate particles from the liquid with which they are in contact.

4. A method of preparing a powder precipitate of cellulose triacetate which comprises mixing an esterification mass, which contains an acylation catalyst and in which the cellulose triacetate is dissolved, with a neutralizing agent for the catalyst, followed by dilution of the mass with 20–40% aqueous acetic acid to dilute it to approximately 55–65% aqueous acid, heating the solution to a temperature within the range of 180–185° F., then rapidly mixing into the solution sufficient 10–30% aqueous acetic acid to bring the acid concentration of the mass down to 30–40% thereby precipitating the cellulose triacetate and forming a slurry, and within fifteen minutes cooling the slurry to a temperature below 120° F. at which the aqueous acid remains liquid and separating the cellulose triacetate particles from the liquid with which they are in contact.

5. A method of preparing a powder precipitate of cellulose triacetate which comprises mixing an esterification mass, which contains an acylation catalyst and in which the cellulose triacetate is dissolved, with a plurality of portions of 20–40% aqueous acetic acid to dilute the mass to approximately 55–65% aqueous acid, one of which portions contains sufficient neutralizing agent to neutralize the catalyst in the mass, heating the solution to a temperature within the range of 180–185° F., then rapidly mixing into the solution sufficient 10–30% aqueous acetic acid to bring the acid concentration of the mass down to 30–40% thereby precipitating the cellulose triacetate and forming a slurry, and within fifteen minutes cooling the slurry to a temperature below 120° F. at which the aqueous acid remains liquid and separating the cellulose triacetate particles from the liquid with which they are in contact.

6. A method of preparing a powder precipitate of cellulose triacetate which comprises mixing an esterification mass, which contains an acylation catalyst and in which the cellulose triacetate is dissolved, with a neutralizing agent for the catalyst and with 20–40% aqueous acetic acid to dilute the mass to approximately 55–65% aqueous acid, heating the solution to a temperature above 170° F., then rapidly mixing into the solution sufficient 10–30% aqueous acetic acid to bring the acid concentration of the mass down to 30–40% thereby precipitating the cellulose triacetate and forming a slurry, and within fifteen minutes cooling the slurry to a temperature of approximately 60° F. and separating the cellulose triacetate particles from the liquid with which they are in contact.

7. A method of preparing a powder precipitate of cellulose triacetate which comprises mixing an esterification mass, which contains an acylation catalyst and in which the cellulose triacetate is dissolved, with a neutralizing agent for the catalyst and with 20–40% aqueous acetic acid to dilute the mass to approximately 55–65% aqueous acid, heating the solution to a temperature above 170° F., then rapidly mixing into the solution sufficient 10–30% aqueous acetic acid, sufficiently cooled, to bring the acid concentration of the mass down to 30–40% and the temperature below 120° F. thereby precipitating the cellulose triacetate and forming a cooled slurry and separating the cellulose triacetate therefrom.

8. A method of preparing a powder precipitate of cellulose triacetate which comprises mixing an esterification mass, which contains an acylation catalyst and in which the cellulose triacetate is dissolved, with a plurality of portions of 20–40% aqueous acetic acid to dilute the mass to approximately 55–65% aqueous acid, one of which portions contains sufficient neutralizing agent to neutralize the catalyst in the mass, heating the solution to a temperature within the range of 180–185° F., then rapidly mixing into the solution sufficient 20% aqueous acetic acid, sufficiently cooled, to bring the acid concentration of the mass down to 30–40% and the temperature below 120° F. thereby forming a cooled slurry containing cellulose triacetate particles and separating the particles therefrom.

CARL J. MALM.
CARLTON L. CRANE.

REFERENCES CITED

The following references are of record in the file of this patent:

UNITED STATES PATENTS

| Number | Name | Date |
|---|---|---|
| 1,860,461 | Hubert | May 31, 1932 |
| 2,010,111 | Schneider | Aug. 6, 1935 |
| 2,177,903 | Martin | Oct. 31, 1939 |
| 2,180,009 | Malm | Nov. 14, 1939 |
| 2,339,631 | Fletcher | Jan. 18, 1944 |